(12) United States Patent
De Paoli

(10) Patent No.: US 6,460,917 B2
(45) Date of Patent: *Oct. 8, 2002

(54) QUICKLY DETACHABLE GLAZING SHEET

(75) Inventor: Martial De Paoli, Cuts (FR)

(73) Assignee: Saint-Gobain Vitrage (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/880,898

(22) Filed: Jun. 15, 2001

(65) Prior Publication Data

US 2001/0030449 A1 Oct. 18, 2001

Related U.S. Application Data

(63) Continuation of application No. 09/341,757, filed on Sep. 21, 1999, now Pat. No. 6,364,404.

(30) Foreign Application Priority Data

Nov. 18, 1997 (FR) .......................................... 97 14388

(51) Int. Cl.[7] .................................................. B60J 1/00
(52) U.S. Cl. .................. 296/201; 296/96.21; 296/96.13
(58) Field of Search .......................... 296/96.13, 96.21, 296/96.22, 201, 146.15, 146.16; 52/214, 204.55

(56) References Cited

U.S. PATENT DOCUMENTS

| | | | |
|---|---|---|---|
| 2,355,264 A | 8/1944 | Bloomfield | 296/96.13 |
| 4,551,372 A | 11/1985 | Kunert | |
| 4,571,278 A | 2/1986 | Kunert | |
| 4,591,203 A | 5/1986 | Furman | 296/201 |
| 4,703,973 A | 11/1987 | Fujikawa | 296/96.21 X |
| 4,723,809 A | 2/1988 | Kida et al. | 296/96.21 |
| 4,933,032 A | 6/1990 | Kunert | |
| 4,951,907 A | 8/1990 | Gold | 296/96.21 X |
| 5,695,236 A | 12/1997 | Banno et al. | 296/96.21 |
| 5,707,101 A | 1/1998 | Rice | 296/201 X |
| 5,806,257 A | 9/1998 | Cornils et al. | 296/96.21 X |
| 5,851,045 A | 12/1998 | Muramatsu | 296/96.21 |

FOREIGN PATENT DOCUMENTS

| | | |
|---|---|---|
| EP | 61198 | 9/1982 |
| EP | 121480 | 10/1984 |
| EP | 0545896 | 5/1989 |
| EP | 398077 | 11/1990 |
| EP | 748709 | 12/1996 |
| EP | 748710 | 12/1996 |
| FR | 2649654 | 1/1991 |
| RU | 2040710 | 10/1992 |

Primary Examiner—Joseph D. Pape
(74) Attorney, Agent, or Firm—Pennie & Edmonds LLP

(57) ABSTRACT

The invention relates to a system for fitting a window into a bay, especially a window of a transport vehicle; the window is rapidly removable, especially to allow the evacuation of passengers in a vehicle. The window (1) is equipped, by bonding, with a frame (2), especially a metal frame, which itself is fixed to the body opening (3) by discrete mechanical fasteners (6). The latter are locked by systems which, for example, are unlocked from the inside of the vehicle. In one embodiment, the frame (16 is made of an elastomer and it has projections (17) on which locking members (18) bear.

22 Claims, 4 Drawing Sheets

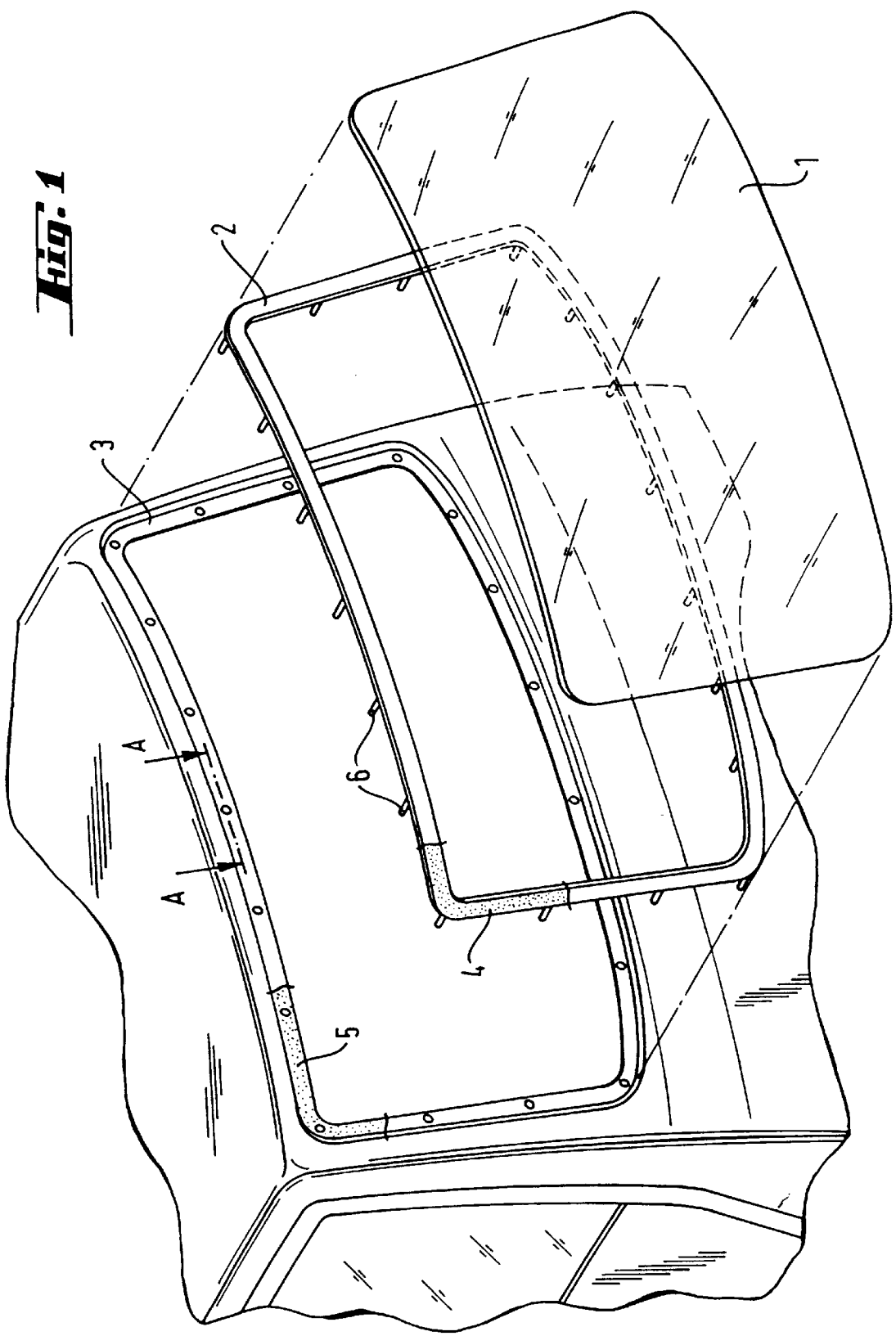

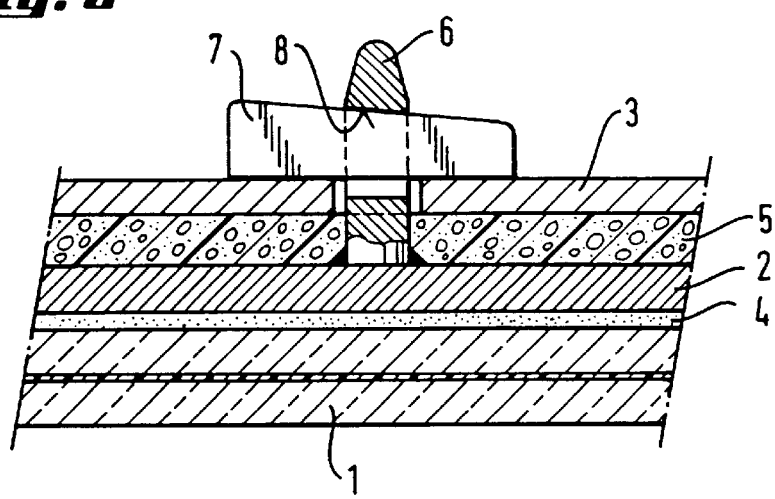
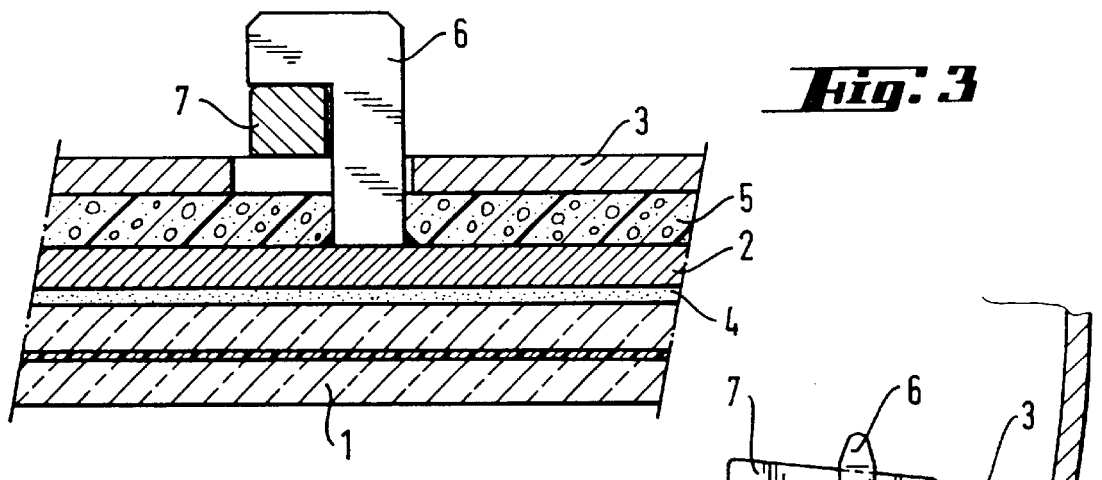
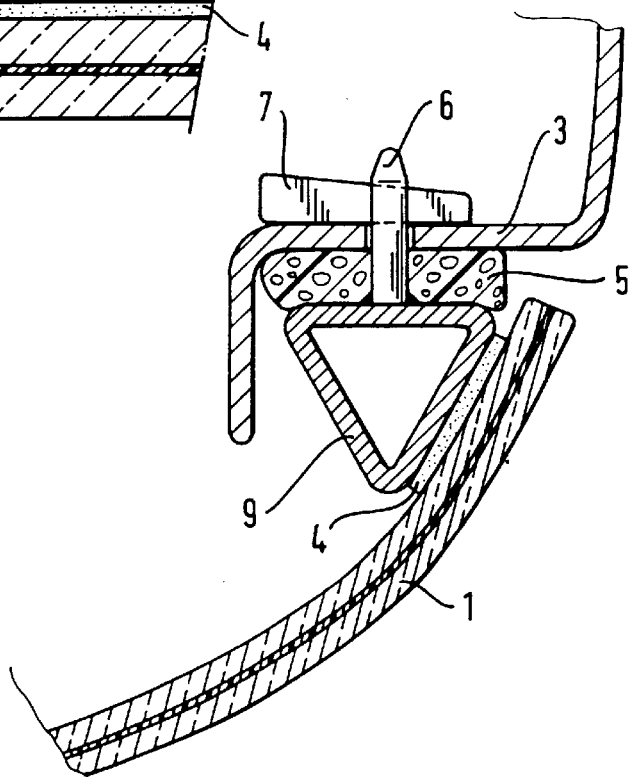

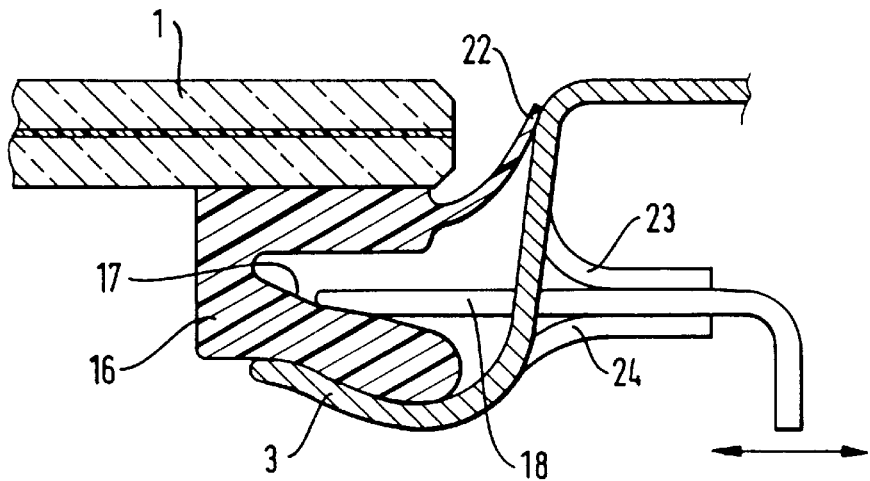
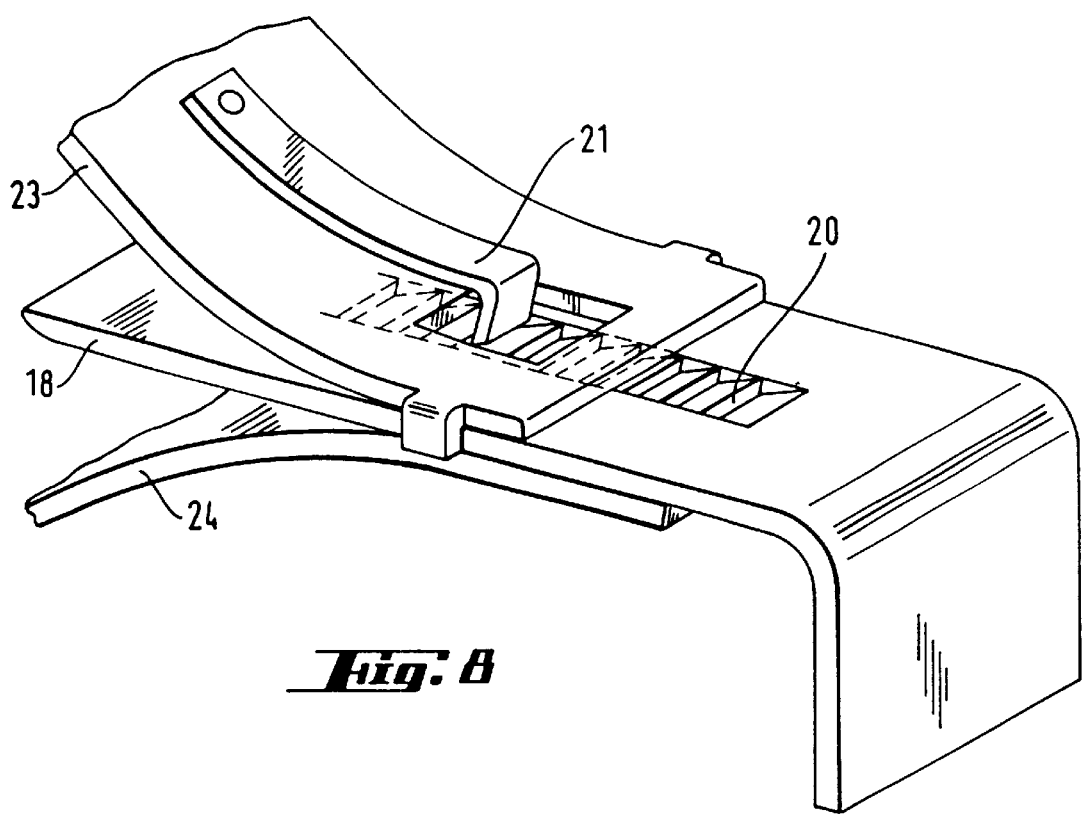

QUICKLY DETACHABLE GLAZING SHEET

This application is a continuation of U.S. application Ser. No. 09/341,757, whose §371 date is Sep. 21, 1999, now U.S. Pat. No. 6,364,404.

The invention relates to a system for fitting a window into an opening, especially a window of a transport vehicle; the window can be rapidly removed, especially in order to allow the evacuation of passengers from a vehicle.

In everyday life, it is often desirable to be able to rapidly make an opening at the place where a window is. This is, for example, the case in premises open to the public when, in the event of a fire, it is desirable to be able to expel toxic fumes rapidly. This is also the case in vehicles for transporting people; in an accident, it may be impractical to get out through the vehicle's usual exits; it is then essential to be able to rapidly create new openings and it is generally desirable to do so at the places where the windows are. One means very often used for producing such openings consists in the use of thermally toughened glass as the window pane. In this case, all that is required to replace the window with an opening is to be able to strike the window pane with a sharp hammer, which causes the toughened glass to break explosively and completely exposes the window opening. In public transport vehicles, it is common to see, for use by the public in the event of danger, small hammers specially suited to breaking toughened glass.

When the glass is not toughened, whether this is a safety glass, but one which is laminated, or a window pane based on a plastic which is difficult to break, then the above methods can no longer be used and it is necessary to be able to use systems for rapidly removing such .windows. Thus, Patent Application EP-A-0,061,198 proposes a window, in particular a vehicle window, which is equipped with a special frame having, all along an elastomer seal, a cable fitted with a handle, the whole assembly being mounted in such a way that by pulling on the handle the cable is extracted from the elastomer sealing strip, this having the effect of disconnecting the window from its peripheral seal and thus of exposing the opening. Another document, EP-A-0,121,480, uses the same kind of principle, but in a much simpler implementation. Here, the window is joined to the opening in the body of a car by means o an extruded elastomer seal which adheres both to the window and to the sheet metal of the body. At the time the extruded elastomer is being deposited on the window, the polymer on the one hand, which will provide, once it has cured, the material of the elastomer, and a wire on the other hand, which is placed at the edge of the elastomer sealing strip, both these going around the entire periphery of the window, have been coextruded. Once the window has been bonded in the body opening, it may be separated from the sheet metal of the opening by pulling on the cable on the opposite side from where it lies. The elastomer seal is thus gradually torn all around the periphery of the window, thereby allowing the window to be extracted from, the opening. The above techniques, which use one and the same cable to release or to cut the peripheral seal which connects the window to the opening, have the drawback of requiring very long lengths of cables to be extracted. In the case of a large window, such as for example the windscreens of a coach or bus, this entails extremely bulky lengths of wires inside the vehicle. Moreover, it takes large forces to break the elastomer seal, but the cross section of the wire necessarily has to remain small, which complicates the choice of a suitable material for making the wire in question. Furthermore, after the window has been extracted, the peripheral seal cannot be used again, that is to say if it was wished to extract the window simply in order to touch up paintwork or for carrying out any other similarly benign operation, the window could not then be refitted since the techniques are irreversible.

The window of the invention, together with its type of mounting, must be particularly suitable for producing windows intended for transport means and especially for buses and coaches. These vehicles are increasingly designed in such a way that they no longer have a glass rear window. In particular, it is often the case that coaches intended for long journeys are equipped at the rear with a baggage compartment occupying the entire height of the vehicle and excluding the possibility of fitting a window in this region. In the event of an accident, this situation entails a major risk for the passengers when the vehicle is lying on its side. This is because, in that situation, the normal exits through the doorways are either under the vehicle or in a high position where they cannot be reached, and the same applies to the side windows. The passengers, desiring to get out of the vehicle quickly, no longer have the opportunity to break the rear window and, under these conditions, it is therefore desirable for the windscreen to be able to be rapidly removed so as to allow the passengers to leave this vehicle in a dangerous situation.

In the particular case of buses and coaches, the object of the invention is therefore to provide a system for fitting, and above all for removing, the windscreen, allowing the opening to be very rapidly exposed.

The object of the invention, in a general manner, is to provide a system for fitting a window into an opening which in particular allows the evacuation of passengers, but which does not have the drawbacks of the previous systems. According to the invention, this object is achieved by virtue of a system for fitting a window into an opening, especially a window of a transport vehicle, having a profiled frame capable of being pulled out of the opening, especially in order to allow the evacuation of Passengers, in which the frame is rigid, in which the window is bonded to the frame and in which the frame is joined to the opening by discrete mechanical fasteners which are released from at least one of the sides of the window, especially from the inside of the vehicle. The use of discrete mechanical fasteners in the invention makes it possible to limit the forces which are associated with each fastener—both the forces for releasing the window when it is desired to expose the opening and the forces used to ensure sealing between the window and the opening.

In one advantageous embodiment, the discrete mechanical fasteners comprise a fastening element extending in a direction not perpendicular to that surface of the window which is engaged with the frame, preferably more or less parallel to this surface, this element being able to move in the said direction in order to release the discrete mechanical fastener. This type of fastener may be simply and rapidly unlocked by a single approximately linear movement using a limited tensile/compressive force.

In order to release the discrete mechanical fasteners, the system according to the invention may advantageously comprise at least one controlled means of release from at least one side of the window and acting on each of the discrete mechanical fasteners, successively or simultaneously, preferably simultaneously.

Such a means of release may act on the said fasteners especially by transferring a mechanical force or by transmitting an electrical signal which actuates the release.

In a first variant of the invention, the fitting system comprises a rigid frame, which is independent, with discrete mechanical fasteners comprising pins that are approximately parallel to one another and to the direction in which the window is fitted into the opening. In this case, the pins pass through corresponding holes and it is a matter of indifference whether the pins are provided on the frame and the holes in the opening, or vice versa. The discrete mechanical fasteners in this variant are particularly secure and guarantee that the operation of fitting the window is greatly simplified, since it is a question of presenting the pins in front of the corresponding holes and inserting them before locking them. It is advantageous, in the case of the above system, for the rigid frame to have a triangular cross section in the regions where the curved window has a high peripheral curvature. Moreover, the pins are locked by cotters which pass through a slot made in the pins, the said slot being approximately perpendicular to their axes. These cotters preferably have an increasing thickness, their width being constant and thus allowing them to slide in the slot in the pins without rotating.

In the case of this variant, it is also advantageous for the cotters to be connected by a cord as means of release, this cord optionally having, between the cotters, locking elements which are placed so as to ensure that they are extracted one by one.

In another advantageous embodiment, the means of release may comprise at least one expandable body, for example a balloon or tube which is inflatable by injecting a pressurized gas and the expansion of which exerts a pressure on a device for releasing the discrete fasteners. This means of release is more particularly appropriate to releasing the discrete fasteners simultaneously.

In another variant of this same system having pins and holes, the invention provides discrete mechanical fasteners which include locking elements associated with the pins, the unlocking of which is achieved by means of an explosive. Advantageously, the system then comprises a device for controlling the explosive, which may be actuated from one side of the window and which may trigger the explosions simultaneously or in succession. In all the illustrative examples of this variant, the sealing between the rigid frame and the opening is preferably achieved by means of a foam seal.

In another variant of the invention, the fitting system includes a rigid frame made of an elastomer. The profile of this frame has projections on which the discrete mechanical fasteners bonded to the opening exert a pressure. Preferably, these discrete mechanical fasteners include locking members, the sliding of which gradually presses the frame against the opening. The locking members may advantageously be designed so as to engage with a means of release, as described above.

This technique makes it possible, firstly by the choice of an elastomer with a suitable hardness and secondly by the choice of a corresponding number of discrete mechanical fasteners, to ensure sealing without any other external means. In the latter case, the discrete mechanical fasteners preferably have cogs in between which a pawl fits in order to lock them and which are released by acting on the pawl.

The figures and the description which follow make it possible to understand the operation of the invention and to appreciate its advantages:

FIG. 1 shows an overall view of the window according to the invention;

FIG. 2 shows a cross section through a discrete mechanical fastener;

FIG. 3 is an alternative embodiment of the same fastener;

FIG. 4 shows the same device fitted to a curved region of the window;

FIG. 7 shows another type of discrete mechanical fastener which uses a frame made of an elastomer; and FIG. 8 is a detail of FIG. 7.

Figure 5:
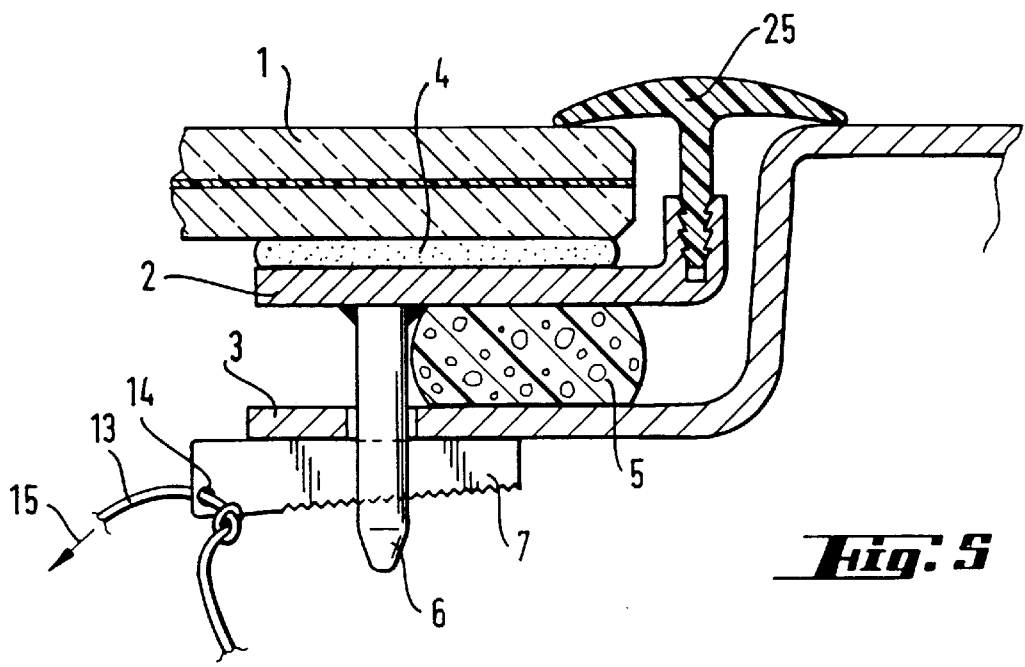
FIG. 5 shows a detailed view of the device in FIG. 2 with, in addition, an extraction cord.

The principle of the invention in the case of a vehicle windscreen may be seen in FIG. 1. Its essential element is a rigid frame 2 joined to the window 1. The frame is mechanically fixed to the window and also in a sealed manner. On the other hand, the rigid frame is joined to the body opening by discrete mechanical fasteners. FIG. 1 shows a simple example of such fasteners, consisting of pins 6 which go into holes in the body opening 3 and which are fastened inside the vehicle by quick-release means. This simplest and preferred embodiment of the invention is illustrated in the subsequent FIGS. 2, 3, 4, 5 and 6.

FIG. 2 shows a cross section through the windscreen, the frame, the sheet metal and the discrete fastening system in a relatively flat region of the window, for example in the central top or central bottom part. The window 1 is a conventional laminated glass pane composed of two glass sheets joined by a thermoplastic film, such as a polyvinyl butyral film. the frame 2 is made of metal; it is designed so as to be able to follow intimately the internal surface of the window's periphery to which the frame is bonded by means of a layer of adhesive 4 such as, for example, a polyurethane-based adhesive, and, moreover, in the example in FIG. 2, it is provided with pins 6 which, in the relatively flat parts of the window, are Perpendicular to the frame. The important point with regard to the direction of the pins with respect to the window and to the frame is that, when the window is being fitted or removed, all the pins are able to be extracted from the holes simultaneously. It is therefore important for them to be parallel to each other, which assumes that, given that the curved shape of the windscreen, they make varying angles with the surface of the latter.

FIG. 4 shows one way of solving the problem regarding the orientation of the pins in the highly curved regions along the edges of the windscreen. In these regions, the use of a frame whose cross section is not rectangular, as in FIG. 2, but which is triangular, as at 9 in FIG. 4, has been chosen.

FIG. 2 shows a locking system which uses a cotter 7. This is inserted into a slot 8 drilled in the pin 6. The cotter 7 has a triangular shape which makes it possible, by pushing it further into the slot 8, to exert an increasing pressure on the sheet metal of the opening 3 and therefore to compress more and more the seal 5 provided between the frame 2 and the sheet metal of the opening 3. This seal 5 is made of a cellular elastomer material, its function being to ensure sealing between the window and the opening; preferably, the seal 5 is bonded only on one side, either to the frame or to the opening, but it is also possible by choosing a suitable material—a material which can tear easily—for there to be effective bonding on both sides and, when removing the window, for there to be tearing within the material of the seal 5.

FIG. 3 shows an alternative embodiment of the discrete fastener in FIG. 2. Here, the pin 6 bonded to the frame has the shape of a hook and the cotter is replaced by a bar 7 which bears on both sides of the hole provided in the sheet metal of the body opening 3. The pin 6 is released by pulling sideways on the bar 7, which acts in the same way as the cotter 7 in FIG. 2. In both cases, it is released without damaging the frame and/or the fastening elements, the window thus extracted from the frame being ready to be used again. The system therefore allows the window to be removed in order to touch up paintwork or for another benign operation, it being simple and rapid to refit the window.

The system of pins and cotters shown in FIGS. 2, 3 and 4 is unlocked simply by acting longitudinally on the cotter 7 or, optionally, laterally in the case of a C-shaped section as in FIG. 3.

FIG. 5 shows an additional element which makes it possible to act in succession on all the cotters 7 of the type shown in FIG. 2 which fasten the windscreen in the opening. This is a cord 13 provided with knots 14 which act as locking elements and allow, when the cord 13 is pulled in the direction of the arrow 15, all the cotters to be removed in succession. It will be understood that, with no knots, the cord 13 is able to unlock the cotters 7 simultaneously. The cord 13 may advantageously be joined to a handle or crank system which will allow the entire windscreen to be unlocked.

As a variant, the cotters 7 may be actuated by means of an expandable device capable, once expanded, of bearing against a corresponding surface of the cotter and of exerting pressure in the direction of the arrow 15. Such a device may especially employ an inflatable tube which engages with all the cotters, or else a series of inflatable balloons each associated respectively with a cotter, the inflation of which may be achieved by means of one or more compressed-gas cartridges actuated from one side of the window.

Figure 6:
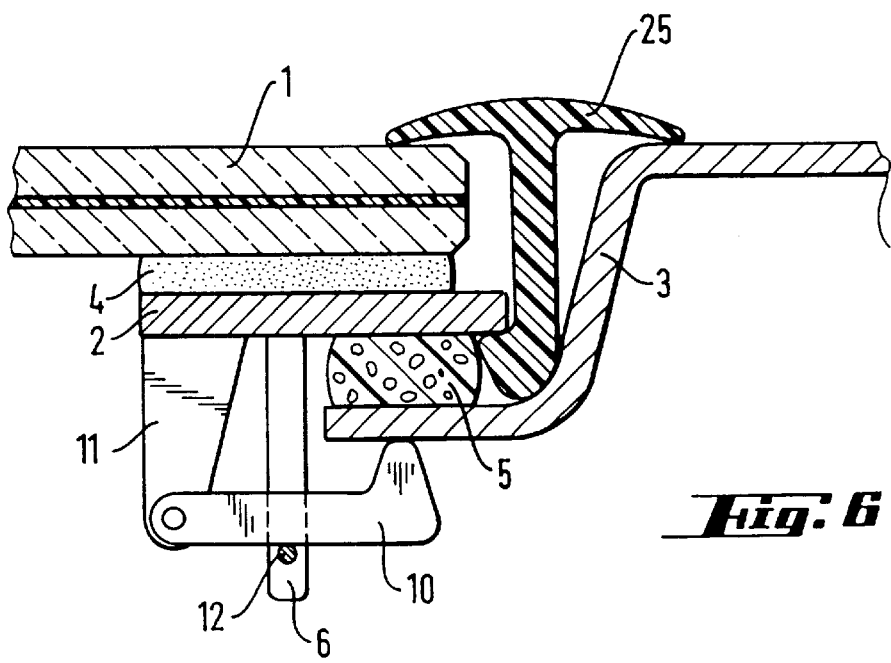
FIG. 6 shows another example of a discrete mechanical fastener—this is an alternative embodiment to the one in FIG. 2.

FIG. 6 shows an alternative embodiment of the system using the pins of FIGS. 1 to 5. This time the frame supporting the pins has an L-shaped section, its leg 11 here carrying levers 10 which bear on the sheet metal of the opening 3 and which are locked in the clamped position by means of pawls 12 placed on the pin 6 (or by means of a cable optionally joined to a crank). The pin systems that have just been described were shown with the pin being joined to the frame 2 and the complementary hole for the pin being in the opening 3. It is obvious that a symmetrical system in which the pin is fastened to the opening and the hole made in the frame would fulfil the same functions. However, in the case of manual locking, this would be much less easy since it would have to be carried out on the inside of the foam seal 5. Provision is also made, by means of an additional component, for a trim strip 25 to be fixed which ensures that there is attractive continuity between the window and the body element (FIGS. 5 and 6).

The locking systems that have just been described are not limiting; in particular, the symmetrical alternative embodiment, with the pin in the opening and holes in the frame, would advantageously be combined with a locking system with explosive bolts. It is known practice, in the aeronautical industry or in the building industry, in order to extract smoke, to use locking systems which can be unlocked by simply sending an electrical signal which explodes small explosive charges that are placed at selected points and that allow systems which, in normal operation, are disabled to be unlocked.

Document RU 2,040,710 thus describes a system of explosive bolts with, in addition, a shape-memory metal. Equivalent systems may be used so as to lock the pins 6, it being possible for the entire assembly to be unlocked instantly and simultaneously by means of an electrical signal which is generated from inside or even from outside the vehicle.

FIGS. 7 and 8 show an alternative embodiment of the device of the invention. In this variant, the rigid frame bonded to the window is no longer made of metal but made of elastomer. Such a frame may advantageously be deposited on the window using a well-known extrusion technique such as, for example, that described in document EP-B-0, 121,481. FIG. 7 shows that the frame is provided with a seal and consists of a two-cart sealing strip, one part being associated with the glass and the other having a projection 17 with an inclined plane, which makes it possible, by means or a locking member 18, to exert a pressure which intimately joins the elastomer seal to the sheet metal 3 of the body. The elastomer frame 16 is advantageously provided with a lip 22 which allows the space separating the window 1 from the fillister of the opening in the body to be partially blocked off. Such a lip is described in particular in document EP-B-0, 545,896. The locking member 18 is designed in such a way that, by sliding through the hole provided in the sheet metal of the body opening 3, it can exert pressure on the projection 17. The locking member 18 is guided in its lateral sliding movement by the two plates 23, 24. The upper plate 23 engages with the locking member 18 so as to lock it when it has finished exerting its pressure on the projection 17. The locking member is in fact equipped with a rack provided with cogs 20 and the upper plate 23 itself is equipped with a pawl 21 which engages so as to lock the locking member each time it has advanced by one cog 20 in the locking direction. The locking member is moreover equipped with a system, not shown, which consists of a return spring, that is to say, as soon as the pawl 21 is lifted, it releases the rack 20 and allows the spring in question to unlock the locking member 18 completely, thus releasing the frame 16. Once all the locking members 18 have been unlocked, all that is then required is to push the windscreen outwards so as to expose the opening.

The systems of the invention that have just beer described in their application to the windscreen of a public transport vehicle are applicable, in the same way, to emergency exits, whether or not they are moreover equipped with windows, and to smoke extraction systems, especially when the window is made of plastic or is a laminated window based on glass and polyvinyl butyral.

Using the systems of the invention, those skilled in the art may very easily arrange for all the discrete-mechanical-fastener systems that are described to be unlocked simultaneously and thus expose the opening in a single operation.

What is claimed is:

1. A system for fitting a window into an opening defined by a body member having a profiled frame and being capable of being removed from the opening, said system comprising a frame (2, 16) and a window (1) bonded to the frame, the frame (2, 16) being joined to the body member defining the opening (3) by discrete mechanical fasteners (6, 7, 10, 12, 18) that include a fastening element (7, 12) extending in a direction not perpendicular to that of the window and which are adapted to be releasable by a substantially linear movement, the mechanical fasteners (6, 7, 10, 12, 18) being releasable from at least one side of the window (1).

2. The fitting system according to claim 1, further comprising at least one release mechanism (13, 14) actuated from at least one side of the window and acting on each of the discrete mechanical fasteners (6) in succession or simultaneously.

3. The fitting system according to claim 1, wherein the rigid frame (2) is an independent member, the discrete mechanical fasteners comprise pins (6) that are approximately parallel to one another and to the direction in which the window (1) is fitted into the opening, the pins (6) pass through corresponding holes (8) in said body member, and wherein the pins (6) are provided on the frame (2) and the holes (8) in the body member defining the opening (3).

4. The fitting system according to claim 3, wherein the rigid frame (2) has a triangular cross section (9) in regions where the curved window (1) has a high peripheral curvature.

5. The fitting system according to claim 1, wherein said window is a window of a transport vehicle.

6. The fitting system according to claim 5, wherein said profiled frame is capable of being removed from said opening in order to allow the evacuation of passengers of the transport vehicle.

7. The fitting system according to claim 5, wherein said side of said window is the inside of said transport vehicle.

8. The fitting system according to claim 2, wherein the at least one release mechanism (13, 14) is adapted to act on each of the discrete mechanical fasteners (6) in succession.

9. The fitting system according to claim 2, wherein the at least one release mechanism (13, 14) is adapted to act on each of the discrete mechanical fasteners (6) simultaneously.

10. The fitting system according to claim 1, wherein the frame (16) is rigid and made of an elastomer and has a profile which includes projections (17) on which the discrete mechanical fasteners (18), which are bonded to the body member defining the opening (3) exert pressure.

11. The fitting system according to claim 1, wherein the discrete mechanical fasteners include locking members (18) which, by sliding, progressively press the frame (16) against the opening (3).

12. The fitting system according to claim 10, wherein the discrete mechanical fasteners (18) have cogs (20) in between which a pawl (21) fits in order to lock them and which are released by acting on the pawl (21).

13. The fitting system of claim 1 wherein a fastener (6) is bonded to the frame and is adapted to hold a fastening element (7), wherein the held fastening element (7) is sized and adapted to bear on the body member having the profiled frame.

14. The fitting system of claim 13 wherein the body member comprises an opening adapted to allow the fastener (6) to slidingly move therein, and wherein the fastening element (7) is adapted to bear on both sides of the opening in the body member.

15. The fitting system of claim 1 wherein the fasteners (6) are bonded to the frame and are adapted to hold the fastening elements (7), wherein the fastening elements (7) are sized and adapted to bear on the body member having the profiled frame.

16. The fitting system of claim 1 wherein the body member comprises holes adapted to allow the fasteners (6) to slidingly move therein, and wherein the fastening elements (7) are adapted to bear on both sides of the holes in the body member.

17. The fitting system of claim 16, wherein the fasteners (6) comprise two sections which are joined one to another and which extend in different directions, wherein C-shaped cross-sections are formed by the combination of the fasteners (6) and the body member, wherein the fastening elements (7) are bars which bear on the body member on both sides of the holes, and wherein the bars (7) are releasable from the C-shaped sections by lateral movement.

18. The fitting system of claim 1, wherein the fasteners are pins, at least some of which having a slot for engaging the fastening element and for facilitating an improved seal between the window and the opening, and wherein the fastening elements are cotters having a triangular shape.

19. A system for fitting a window into an opening defined by a body member having a profiled frame, said system comprising:

a frame and a window attached to the frame, wherein said window is a window of a transport vehicle;

mechanical fasteners which are approximately parallel to the direction in which the window is fitted into the opening and which pass through corresponding holes in said body member; and fastening elements sized and adapted to bear on the body member, wherein a fastening element is associated with each mechanical fastener, wherein the fastening elements extend in a direction not perpendicular to the surface of the window and are adapted to be releasable by a substantially linear movement, the frame being removably joined to the body member defining the opening by the mechanical fasteners and fastening elements associated therewith;

wherein after at least one fastening element is released the window is capable of being removed from the opening and the at least one mechanical fastener is releasable from at least the side of the window inside of said transport vehicle.

20. The system for fitting a window of claim 19, wherein the frame has in at least one location a triangular cross-section, and is joined to the body member defining the opening by a plurality of discrete mechanical fasteners that each include a fastening element which extends in a direction not perpendicular to that of the window and which are adapted to be releasable by a substantially linear movement, wherein after each of said fasteners are released the window and frame are capable of being removed from the opening, wherein the mechanical fasteners are approximately parallel to one another, and wherein each of the fasteners are disposed on the frame and within holes in the body member defining the opening.

21. The system for fitting a window of claim 19, wherein the frame is joined to the body member defining the opening by a plurality of discrete mechanical fasteners that each include a fastening element which extends in a direction not perpendicular to that of the window and which are adapted to be releasable by a substantially linear movement from the side of the window inside of said transport vehicle, wherein the fasteners comprise pins, at least some of which having a slot for engaging the fastening element and for facilitating an improved seal between the window and the opening, wherein the fastening elements are cotters or bars, and wherein after each of said fastening elements are released the window and optionally the frame are removable from the opening.

22. The fitting system of claim 21, wherein the fasteners are in the shape of a hook, such that C-shaped sections are formed by the combination of the hook and the body member defining the opening, and wherein the fastening elements are bars which bear on both sides of the holes provided in the body member, such that the bars are releasable from the C-shaped sections by lateral movement.

* * * * *